Figure 1:
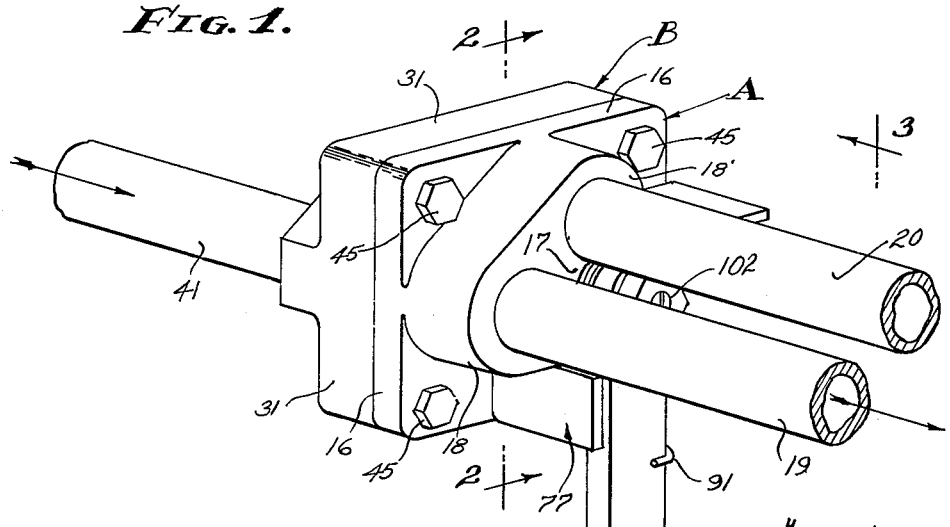

Aug. 22, 1961  N. P. NILSEN  2,997,273
FLUID HANDLING VALVE
Filed Aug. 13, 1957  2 Sheets-Sheet 1

INVENTOR.
NORMAN P. NILSEN
BY
Wm. H. Maxwell
AGENT

Aug. 22, 1961  N. P. NILSEN  2,997,273
FLUID HANDLING VALVE
Filed Aug. 13, 1957  2 Sheets-Sheet 2

INVENTOR.
NORMAN P. NILSEN
BY
Wm. H. Maxwell
AGENT

# United States Patent Office 2,997,273
Patented Aug. 22, 1961

2,997,273
FLUID HANDLING VALVE
Norman P. Nilsen, P.O. Box 33, Phelan, Calif.
Filed Aug. 13, 1957, Ser. No. 678,004
7 Claims. (Cl. 251—185)

This invention relates to fluid handling valves and is particulary concerned with a valve for controlling the flow of fluid from an inlet to one or more outlets by manual selection as circumstances require, it being a general object of this invention to provide a simple, inexpensive, yet reliable valve structure that is operable under a wide variety of conditions.

Various types of valves have been provided, each type having certain advantages and disadvantages. For the most part, valves are usually characterized by mechanical parts and elements that require exacting fits, and seals. For example, globe valves, gate valves, plug valves, and slide valves etc. involve a seat and a valve element that is matched to fit the seat, the matching parts being accurately machined. In some cases the valve element is lifted from the seat and in other cases there is sliding action between the valve element and seat. Further, many valves employ pressure or clamping or wedging action between the valve element and seat, and require operating means adapted to apply the necessary pressure or force. Also, most valves are limited in their application and are not suited to installations handling acid solutions, caustic solutions, and abrasive fluids, and the like. In general, the usual valve is subject to leakage, and to freezing or jambing in one position, and they are usually slow to operate, and are provided with no positive or visible indication of the position of the valve element.

It is an object of this invention to provide a fluid handling valve that requires a minimum of machining and no close tolerance fits in its manufacture. The valve that I provide involves but a few easily formed parts that are of simple form and that are so related as to eliminate the necessity of any close fits.

Another object is to provide a valve of the character referred to that employs a simplified seal that has long wearing properties and which is adapted to withstand mechanical action and abrasion, as well as chemical action. The valve element, in the structure that I provide, is somewhat flexible and has a continuous wiping action with the valve seat, and the valve seat is resilient with a tough face that is not only resistant to abrasion but is not affected by acids and caustic solutions. Furthermore, the valve element and seat are of dissimilar abrasion resistant and corrosive resistant materials reducing the possibility of the valve becoming jambed, and further provide a coefficient of friction that allows for relatively free and easy turning or shifting of the valve element.

It is still another object of this invention to provide a valve of the character above referred to that will handle fluid under pressure to allow free unobstructed flow therethrough when opened, and that will stop fluid under pressure and prevent leakage when closed. In the valve structure that I provide, both the valve seat and valve element are flexible so that there is conformity of one to the other, and with the result that there is proper co-operation between the seat and valve element at all times. The valve seat is of a soft resilient construction with a wear taking face, and the valve element is a plate like construction of substantial strength and flexibility.

Still another object of this invention is to provide a valve that is adapted to control several outlet ports as circumstances require. The valve structure that I provide may be used to handle fluid under pressure from a pressure inlet and direct it of a single outlet, or direct it alternately to several outlets.

An object of this invention is to provide a valve with an operating means that is easily and quickly operable to open and close the valve. With the operating structure that I provide the valve element is advanced one step at a time and there is a direct and positive indication of the position of the valve element.

It is an object to provide a valve of the character referred to wherein the valve element per se is free floating and seals without applying mechanical forces to the element. In the structure that I provide the valve element is universally mounted and seals when fluid pressure is applied. A spring element normally holds the valve element in sealing position before application of fluid pressure.

Figure 2:
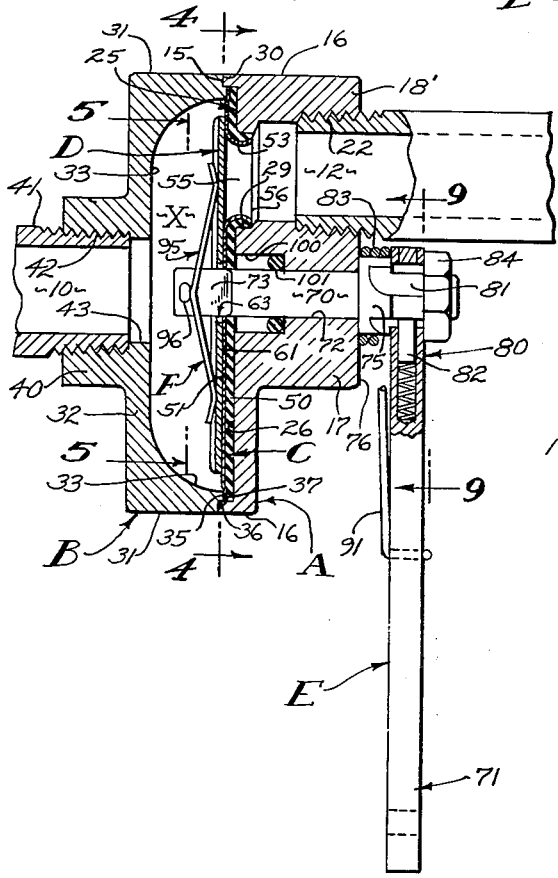
Figure 3:
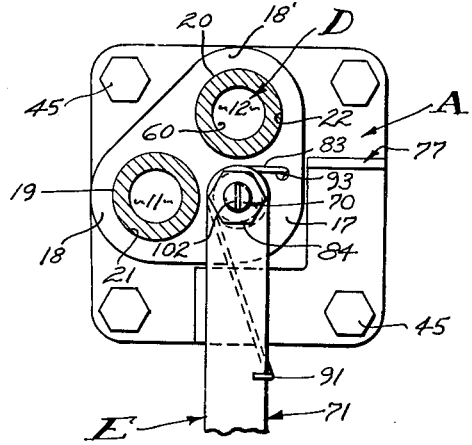
Figure 4:
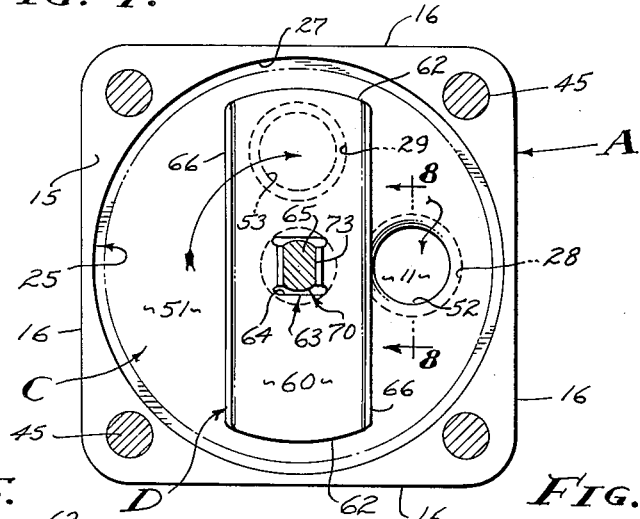
Figure 5:
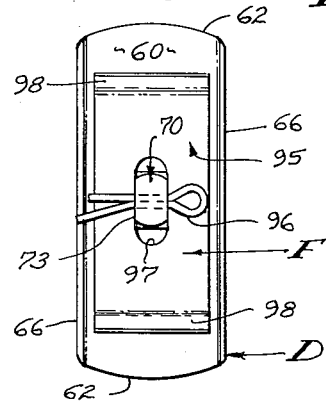
Figure 6:
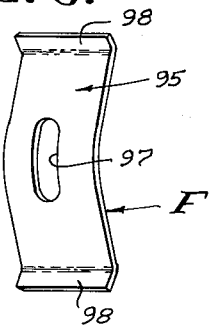
Figure 7:
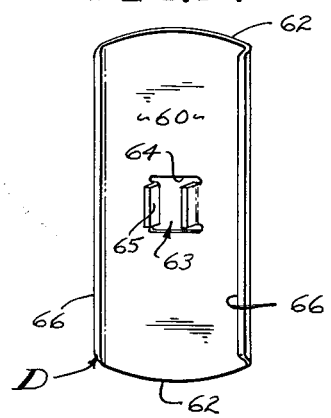
Figure 8:
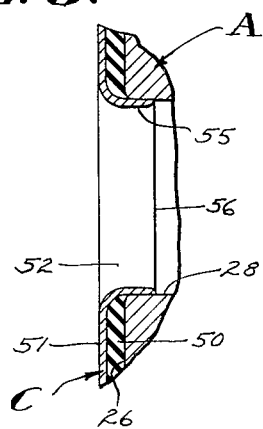
Figure 9:
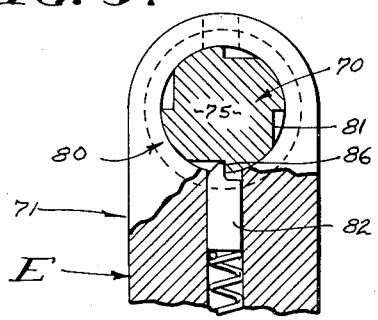

The various objects and features of this invention will be fully understood from the following detailed description of a typical preferred form and application of this invention, throughout which description reference is made to the accompanying drawings, in which:

FIG. 1 is a perspective view of the valve of the present invention showing it connected to pipe lines adapted to carry fluid controlled by the valve. FIG. 2 is an enlarged sectional view taken substantially as indicated by lines 2—2 on FIG. 1. FIG. 3 is a view taken as indicated by lines 3—3 on FIG. 1. FIG. 4 is an enlarged sectional view taken as indicated by lines 4—4 on FIG. 2. FIG. 5 is an enlarged detailed view of a portion of the valve taken as indicated by lines 5—5 on FIG. 2. FIGS 6 and 7 are views of two of parts shown in FIG. 5 and separate from the other parts. FIG. 8 is an enlarged detailed sectional view of a portion of the structure, showing one of the parts therein, and taken as indicated by lines 8—8 on FIG. 4, and FIG. 9 is an enlarged detailed sectional view of a portion of the valve and taken as indicated by lines 9—9 on FIG. 2.

The fluid handling valve, as illustrated in the drawings, is adapted to control the flow of fluid under pressure from an inlet 10 to an outlet 11, as shown, to outlets 11 and 12. The valve is designed primarily, to handle fluid under pressure flowing in one direction, that is, fluid under pressure applied to the inlet 10, the said fluid under pressure being employed to force the valve element onto the valve seat. The valve structure that I provide involves, generally, a body A, a cover B overlying a portion of the body A and establishing a chamber X, a seat C carried by the body and having one or more outlet ports, a valve element D cooperatively engaged with the seat, an operating means E for shifting the valve element D, and means F retaining the movable elements of the valve in working position.

The valve body A is essentially a flat plate-like element with a flat inner face 15, and as shown, the body A is rectangular or square having like sides 16. The valve element D is rotated by the operating means E and is carried on a central axis that extends through the valve on a line normal to the plane of the face 15. A central boss 17 projects from the exterior of the body A to carry the shaft of the operating means E, as later described, and the boss 17 is, preferably, laterally enlarged at 18 and 18′ to receive the end portions of the outlet pipes or tubes 19 and 20 (see FIG. 1). The pipes 19 and 20 may be threadedly engaged in outlet openings 21 and 22, respectively, that enter the body A from the exterior thereof. Assuming that the body A is positioned in a vertical plane or position, one of the outlet openings may be located vertically above the central axis and the other outlet opening may be located horizontally to one side of the central axis. As shown, the outlet openings are laterally spaced from the said central axis of the valve, and they are circumferentially spaced one from the other. In the case illustrated, the two outlet openings 21 and 22 are spaced 90° from each other.

In accordance with the invention a recess 25 is provided in the face 15 of the valve body A in order to receive and accommodate the valve seat C. The recess 25 has a simple flat turned bottom surface 26 spaced from the face 15 and parallel therewith. A circular wall 27, concentric with the central axis of the valve, joins the face 15 and surface 26, and also acts to guide the cover B later described. As best illustrated in FIGS. 2 and 4 of the drawings, outlet ports 28 and 29 are provided in the body A to extend through the body from the recess 25 to the outlet openings 21 and 22, respectively. The two ports 28 and 29 are laterally spaced equal distances from the said central axis of the valve, and they are circumferentially spaced from each other, preferably 90° apart.

The cover B that overlies a portion of the body A to form or establish the chamber X, is also a flat plate-like element with a flat inner face 30, and as shown, the cover B, like the body A, is rectangular or square having like sides 31. The cover B has a wall 32 spaced from the plane of the face 30 and joining the sides 31 so that a closed chamber X is formed when the faces 15 and 30 are in abutment. In practice, the inner side wall 33 of the chamber X is round and concentric with the central axis of the valve, and of a diameter somewhat less than the diameter of the wall 27 of the recess 25. A feature of construction is a rim 35 that projects from the face 30 and enters the recess 25. The rim 35 has an outer shoulder 36 that slidably engages the wall 27 and has a continuous peripheral land 37 spaced from the surface 26 of the recess 25 and parallel therewith.

A boss 40 projects from the exterior of the cover B to receive the end portion of an inlet pipe or tube 41 (see FIGS. 1 and 2). The pipe may be threadedly engaged in an inlet opening 42 that enters the cover B from the exterior thereof and which is in communication with an inlet port 43 that enters the chamber X. In practice, the boss 40 and opening and port are located so that they will align with one of the outlet openings and ports in the body A. It will be observed that the particular valve shown can be assembled with the inlet aligned with either one of the outlets of the valve, by simply selecting the desired rotative relationship between the body A and cover B.

The body A and cover B are secured together by any suitable means, and in the drawings I have illustrated through bolts 45, one at each corner portion of the structure. As shown, simple drilled openings are provided in the body and cover, the bolts 45 being engaged through the openings and secured, either by threads in one part or by nuts threaded onto the bolts. It will be apparent that the body A and cover B are suitably clamped together in tight face to face engagement.

The seat C that is carried by the body A is, essentially, a disc-shaped construction involving, generally, a backing element 50, and a facing element 51. The backing element and facing element may be individually formed and installed in working position as separate parts, or they may be formed as a unit and then installed in working position, as may be required under different operating conditions. In accordance with the invention the elements 50 and 51 form the valve seat C which is resilient and wear resistant, and which is resistant to chemical action of fluids handled by the valve.

The backing element 50 is made of an elastic or resilient material, such as rubber or the like, as stated above, the seat C is disc-shaped, in which case the element 50 is a flat circular body of elastic material. As shown, the body of elastic material is of limited but of substantial thickness, and there are openings therein that register with the ports 28 and 29, as later described.

The facing element 51 is made of a low friction and corrosive resistant material that is tough and pliant and which will not abrade or be seized by the metal valve element D later described. I prefer, in practice, to employ "Teflon" or tetrafluoroethylene as manufactured by Du Pont de Nemours to form the facing element 51, which is also a flat circular body of material. In practice the facing element is made substantially thinner than the backing element 50, the two elements 50 and 51 assembled face to face, there being openings in the facing element that register with the openings in the backing element and with the ports 28 and 29, as later described.

In accordance with the invention the two elements 50 and 51 are laminated and when in working position in the recess 25 they are clamped between the surface 26 and the land 37, above referred to. It will be apparent that the chamber X is thereby adequately sealed by suitable compression of the elements 50 and 51, as indicated in the drawings (FIG. 2).

It is to be understood that the backing element 50 and facing element 51 can be permanently laminated and secured together, either by cementing or vulcanizing, or by any suitable chemical or mechanical action or process. Thus, the elements 50 and 51 become a unit of construction and therefore, more easily handled. Further, the elastic or resilient backing element may be secured permanently in the recess 25, either by cementing or vulcanizing etc. Under ordinary conditions the above mentioned securing methods are not necessary, but under extraordinary and extreme conditions it may be deemed necessary to secure the valve seat C in working position, in addition to being clamped in place by the cover B.

As best illustrated in FIG. 8 of the drawings, it is a feature of the invention to provide openings 52 and 53 in the valve seat C that register with the ports 28 and 29 in the body A. As shown, the openings 52 and 53 are alike and the seat C is provided with projecting lips 55 at each opening to provide a seal between the seat C and body A. The lips 55 may vary somewhat as circumstances require and are preferably formed to the configuration of the port and enter the port a substantial distance. The lips 55 terminate in a tapered or feathered edge 56 that acts against the walls of the ports to seal when fluid pressure is applied. The lips 55 involve mainly, the extension of the facing element 51 that is corrosive resistant etc. and which seals with the body A within the ports 28 and 29 to isolate the backing element from fluid handled by the valve.

The valve element D that cooperatively engages with the seat C above described, is a flat plate 60 that is shiftably carried within the chamber X to cover and uncover the outlet ports 28 and 29 in the body A. The valve plate 60 is made of a corrosive resistant material that is strong and resilient, for example, of a corrosion resistant steel such as stainless steel. The valve element D may be a disc-shaped part suitably ported to control the flow of fluid, however, in practice, I preferably form the plate 60 from sheet metal and so that it is flat and elongate in form. The plate 60 is of a length to span the valve seat C in order to cover the ports and openings above referred to, and it is rotatably carried within the chamber X and has a flat sealing face 61 that slidably engages with the seat C.

The plate 60 is preferably double ended and has diametrically opposite ends 62 and there is a central opening 63 in the plate midway between the ends. The opening 63 has end faces 64 adapted to position the plate and has parallel side faces 65 adapted to engage with the operating means E, later described. In practice, the side faces 65 may involve turned-up portions of the plate to the end that a substantially large flat area is presented at each side of the opening. Further, each side of the plate 60 is provided with an upturned flange 66 that reinforces the plate to insure that it normally remains flat, and which presents a radius at each edge of the plate to insure smooth operation and easy turning of the plate. The width of the plate 60 is such as to adequately cover the openings in the valve seat C when overlying the same, and such as to lie adjacent the openings when the valve element D is turned away from the openings, as shown in FIG. 4.

The operating means E may vary in form as circumstances require and is preferably a ratchet drive that selectively advances the valve element D one step at a time. The means E involves, generally, a shaft 70 that rotatably carries the valve plate 60 within the chamber X, an operating lever 71 coupled to the shaft 70 and a stop 77 for limiting movement of the lever 71. A bore 72, concentric with the central axis of the structure, extends through the body A and enters the chamber X. The shaft 70 is rotatably carried in the bore and projects into the chamber where it terminates in a flattened inner end portion with faces 73 that engage with the side faces 65 of the opening in the valve element D. As shown, the said inner end portion of the shaft projects well through the plate 60. The outer end of the shaft 70 projects from the exterior of the body A and carries the operator or lever 71 that rotates the shaft 70 to position the valve element D.

In the preferred form of the invention, the operating means E involves a ratchet drive 80, in which case the means E includes a toothed element 81, a pawl 82, and a return means 83. The lever 71, in the case illustrated, is rotatably mounted on the outer end of the shaft 70, the shaft being provided with a head portion 75 with an inwardly facing shoulder that stops inward movement of the shaft by engaging an outer wall 76 of the body A. A nut 84 retains the lever 71 in working position. The toothed element is formed in the head 75 and when the ports 28 and 29 are 90° apart, there are four steps or teeth faced in the direction that it is desired to operate the lever 71 to advance the shaft. The pawl 82 is shown in the form of a spring biased pin (see FIG. 9) that has a sharpened part with a flat face 86 adapted to have driving engagement with the toothed element 81. The return means 83 is in the form of a spring that surrounds the shaft 70, or head thereof, and which has an arm portion 91 that yieldingly urges the lever 71 to a neutral or unactuated position (see FIG. 2). The spring is anchored at 93 (see FIG. 3).

The means F that I provide for retaining the movable elements of the valve in working position is best illustrated in FIGS. 2 and 5 of the drawings. As shown, the means F involves, a pressure plate 95 and a key 96. The plate 95 (see FIG. 6) is an elongate spring element with a central opening and with diametrically opposite end portions 98 adapted to have pressure engagement with the plate 60, from the chamber side thereof. The opening 97 in the plate 95 is flat sided in order to have driving engagement with the flattened inner end portion of the shaft 70, so that the plate turns with the shaft. In accordance with the invention the plate 95 is curved or bent so that the center portion thereof is raised above the plane of the plate 60 when the end portions 98 thereof are in engagement with the plate 60. The key 96 is a pin like part, preferably a cotter key, as shown, and extends through an opening in the flattened end portion of the shaft 70. The key, when in working position slightly depresses the pressure plate 95 to the end that the valve element D is yieldingly held in pressure engagement with the seat C.

In order to seal the shaft 70, or stem of the valve, the bore 72 is recessed or counterbored at 100 from the inner end thereof, and receives a sealing ring 101. Fluid pressure acts upon the ring 101 to seal with the shaft and bore respectively.

From the foregoing detailed description of my invention it will be apparent that I have provided a very simple valve structure. In spite of the simplicity, however, the valve is very practical since it is easily assembled and maintained, is easily operated and very quickly operable by a single manual movement, is adapted to handle abrasive laden and corroisve fluids, and it can be readily determined what position the valve is in. A mark 102 in alignment with the valve element D indicates positively the condition of the valve. The coefficient of friction between the material forming the seat C and valve element D is such that the valve turns or operates freely and easily and in a uniform manner. Further, the resilient character of both the seat C and valve D is such as to insure a tight fluid seal when the valve parts are closed, due to the function of the parts conforming to each other's configuration in spite of possible irregularities in the formation of said parts. Further, the size of the valve can be materially reduced by employing a single ended plate 60, and by correspondingly reducing the size of the body A, cover B and seat C, and it will be apparent that the valve element D would then be alternately shifted back and forth in the chamber X.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. A valve of the character described including, a body having a recess therein with a flat bottom surface and with a port opening through said surface and into the recess, a valve seat fixed in the recess and with an opening therein aligned with the port, said valve seat comprising a flat resilient backing element engaged with said bottom surface and a flexible facing element coextensive with and overlying the backing element and exposed to the recess, a shaft entering the recess and rotatably carried by the body and adjacent the port and opening in the body and seat respectively, and an elongate flat plate-like valve element of spring material and carried on the shaft and extending diametrically and yieldingly urged into flat engagement with the facing element of the seat and adapted to be rotatively positioned by the shaft to overlie and depress into said opening.

2. A valve of the character described including, a body having a recess therein with a flat bottom surface and with a port opening through said surface and into the recess, a valve seat fixed in the recess and with an opening therein aligned with the port, said valve seat comprising a flat resilient backing element of rubber-like material coextensive with and engaged with said bottom surface and a flexible facing element coextensive with and overlying the backing element and exposed to the recess, a shaft entering the recess and rotatably carried by the body and adjacent the port and opening in the body and seat respectively, and an elongate flat plate-like valve element of spring material and carried on the shaft and extending diametrically and yieldingly urged into flat engagement with the facing element of the seat and adapted to be rotatively positioned by the shaft to overlie and depress into said opening.

3. A valve of the character described including, a body having a recess therein with a flat bottom surface and with a port opening through said surface and into the recess, a valve seat fixed in the recess and with an opening therein aligned with the port, said valve seat comprising a flat resilient backing element coextensive with and engaged with said bottom surface and a flexible facing element of corrosive resistant material coextensive with and overlying the backing element and exposed to the recess, a shaft entering the recess and rotatably carried by the body and adjacent the port and opening in the body and seat respectively, and an elongate flat plate-like valve element of spring material and carried on the shaft and extending diametrically and yieldingly urged into flat engagement with the facing element of the seat and adapted to be rotatively positioned by the shaft to overlie and depress into said opening.

4. A valve of the character described including, a body having a recess therein with a flat bottom surface and with a port opening through said surface into the recess, a valve seat fixed in the recess and with an opening therein aligned with the port, said valve seat comprising a flat resilient backing element coextensive with and engaged with said bottom surface and a flexible facing element of tetrafluoroethylene coextensive with and overlying the backing element and exposed to the recess, and a shaft entering the recess and rotatably carried by the body and adjacent the port and opening in the body and seat respectively, and an elongate flat plate-like valve element of spring material and carried on the shaft and extending diametrically and yieldingly urged into flat engagement with the facing element of the seat and adapted to be rotatively positioned by the shaft to overlie and depress into said opening.

5. A valve of the character described including, a body having a recess therein with a flat bottom surface and with a port opening through said surface and into the recess, a valve seat fixed in the recess and with an opening therein aligned with the port, said valve seat comprising a flat resilient backing element of rubber-like material coextensive with and engaged with said bottom surface and a flexible facing element of corrosive resistant material coextensive with and overlying the backing element and exposed to the recess, a shaft entering the recess and rotatably carried by the body and adjacent the port and opening in the body and seat respectively, and an elongate flat plate-like valve element of spring material and carried on the shaft and extending diametrically and yieldingly urged into flat engagement with the facing element of the seat and adapted to be rotatively positioned by the shaft to overlie and depress into said opening.

6. A fluid handling valve of the character described including, a body having a central bore extending therethrough and having a recess therein and with a port opening laterally of the bore, a cover overlying the recess in the body and defining a chamber therein, a shaft rotatably carried in the bore and extending therethrough to project into the recess, a flat valve seat fixed in the recess and with an opening therein aligned with the port and an opening passing the shaft, said valve seat comprising a flat resilient backing element and a flexible facing element coextensive with and overlying the backing element, and an elongate flat plate-like valve element of flexible spring material coupled to the shaft and in flat engagement with the facing element of the seat and adapted to be rotatively positioned by the shaft to lie adjacent the port opening or to overlie and depress into said opening.

7. A fluid handling valve of the character described including, a body having a central bore extending therethrough and having a recess therein and with a port opening laterally of the bore, a cover overlying the recess in the body and defining a chamber therein, a shaft rotatably carried in the bore and extending therethrough to project into the recess, a flat valve seat fixed in the recess and with an opening therein aligned with the port and an opening passing the shaft, said valve seat comprising a flat resilient backing element of rubber-like material and a flexible facing element of tetrafluoroethylene coextensive with and overlying the backing element, and an elongate flat plate-like valve element of flexible spring material coupled to the shaft and in flat engagement with the facing of the seat and adapted to be rotatively positioned by the shaft to lie adjacent the port opening or to overlie and depress into said opening.

References Cited in the file of this patent

UNITED STATES PATENTS

| | | |
|---|---|---|
| 1,121,140 | Schoonmaker | Dec. 15, 1914 |
| 1,490,150 | Wagner | Apr. 15, 1924 |
| 2,089,943 | Busby | Aug. 17, 1937 |
| 2,302,061 | Schirm | Nov. 17, 1942 |
| 2,561,559 | Brown | July 24, 1951 |
| 2,582,752 | Harr | Jan. 15, 1952 |
| 2,583,869 | Monson | Jan. 29, 1952 |
| 2,584,161 | Scherer | Feb. 5, 1952 |
| 2,661,019 | Snyder | Dec. 1, 1953 |
| 2,809,011 | Davis | Oct. 8, 1957 |